United States Patent [19]

Pusch

[11] 4,150,189

[45] Apr. 17, 1979

[54] SHAPEABLE INSULATING MATERIAL FOR USE WITH MOLTEN ALUMINUM

[75] Inventor: Walter G. Pusch, Littleton, Colo.

[73] Assignee: Johns-Manville Corporation, Denver, Colo.

[21] Appl. No.: 537,506

[22] Filed: Dec. 30, 1974

[51] Int. Cl.$^2$ .................. C04B 35/02; D01F 1/02; B28B 3/00

[52] U.S. Cl. .................. 428/358; 106/64; 106/104; 264/211; 264/333

[58] Field of Search .......... 106/104, 64; 264/333, 264/211; 428/358

[56] References Cited

U.S. PATENT DOCUMENTS

| | | | |
|---|---|---|---|
| 1,716,527 | 6/1929 | Martin | 106/104 |
| 2,376,919 | 5/1945 | Hutchcroft | 106/104 |
| 2,793,128 | 5/1957 | Emhiser | 106/64 |
| 3,042,536 | 7/1962 | Bishop | 106/104 |
| 3,125,454 | 3/1964 | Dolph | 106/104 |
| 3,220,915 | 11/1965 | Shannon | 106/104 |
| 3,269,849 | 8/1966 | Caprio | 106/64 |
| 3,294,562 | 12/1966 | Caprio | 106/64 |
| 3,360,594 | 12/1967 | Criss | 106/64 |
| 3,597,249 | 8/1971 | Shannon | 106/104 |

OTHER PUBLICATIONS

Bille, U.S. Pat. Ser. No. 248,646 5-1943.

*Primary Examiner*—John F. Niebling
*Attorney, Agent, or Firm*—Robert M. Krone; Joseph J. Kelly; James W. McClain

[57] ABSTRACT

A composition is described for formation of shaped insulating articles compatible with and resistant to molten aluminum. The composition comprises calcium aluminate cement, chrysotile fibers, cryolite, inorganic filler, and, preferably, refractory fiber. Shaped articles, especially elongated troughs and flat boards, made from the composition are also described. In addition, extrusion, press molding, and similar shaping processes for formation of the articles are described.

13 Claims, No Drawings

SHAPEABLE INSULATING MATERIAL FOR USE WITH MOLTEN ALUMINUM

BACKGROUND OF THE INVENTION

The invention herein relates to refractory compositions of material which can be shaped, as by molding or extruding, and in their shaped configuration can be used in contact with molten aluminum.

Over the past years, a large number of materials have been used in the aluminum industry to convey and handle the molten metal. A particularly troublesome area has been found in the troughs through which the molten metal is poured, and several types of materials have been used for such troughs. In some cases the troughs have been built up out of refractory cements. This, however, has required the construction of a trough-shaped frame which is thereafter coated with the refractory cement lining. Such in-line construction has been quite expensive in terms of the hand crafting required, plus there is a substantial amount of time during which the molten metal production facility must be down.

Another approach to the handling of the molten aluminum has been to construct the troughs out of flat boards made of refractory materials. One type of material which has proved highly successful for such use in that sold under the trademark "MARINITE" by the Johns-Manville Corporation. While this composition has proved to have excellent service characteristics, it is manufactured only in the form of flat boards. Three flat boards must therefore be joined together in a "U" shape to form the desired trough for conveying the molten metal. This of necessity means that each trough contains longitudinal joints between adjacent boards. Such joints have in the past led to problems of metal loss through the joints and deterioration of the troughs at the joints.

It will thus be apparent that there is a distinct need for a material from which unitary troughs can be shaped at factory locations and then merely installed on site at the molten metal processing facility. Such preformed unitary troughs can be readily and easily installed where they are to be used with minimum downtime of the molten metal casting equipment. Further, their unitary nature eliminates longitudinal joints.

BRIEF SUMMARY OF THE INVENTION

The invention herein comprises a composition of material capable of being formed into a shaped body and which is highly resistant to attack and wetting by molten aluminum, the composition comprising, in parts by weight: calcium aluminate cement, 30 to 55 parts; chrysotile fiber, 2 to 25 parts; inorganic filler, 10 to 35 parts; cryolite, 0.5 to 5 parts; and sufficient water to make the mixture tractable while yet capable of being formed into a shape retaining body. In a preferred embodiment the insulating composition further comprises 10 to 30 parts by weight of refractory fiber, commonly fibers of mixed refractory oxides such as silica and alumina.

The invention also comprises shaped bodies made from the composition to this invention. The shaped bodies may be in the form of unitary elongated troughs, curved or flat boards, hollow or solid cylinders, hollow or solid elongated rectangular (or other polygonal) bars, and the like.

Further, the invention comprises a method of forming unitary shaped bodies which are useful for conveying and otherwise contacting molten aluminum, which comprises forming the above described composition, shaping the composition into the desired configuration by plastic molding, preferably extrusion or pressing, curing and drying the shaped body, and thereafter heating it at temperatures in excess of 480° C., and preferably at temperatures of at least 650° C., for a period of at least 30 minutes.

DETAILED DESCRIPTION AND PREFERRED EMBODIMENTS

The compositions of this invention is one which has the combined properties of being a thermal insulating medium which retains the aluminum metal in molten condition and also being resistant to attack by the molten metal. These novel and superior properties are the result of a synergistic combination of several components: calcium aluminate cement, chrysotile fiber, cryolite, inorganic filler, and water.

Calcium aluminate cement is also known as aluminous cement or high alumina cement. It is made by fusing a mixture of limestone and bauxite with small amounts of silica and titania. Calcium aluminate cements commonly comprise approximately 37% to 46% alumina, 36% to 42% calcium oxide, 3% to 10% silica, 1% to 4% titania, and 3% to 26% of iron oxides. Small amounts of other materials such as magnesia, titanium metal, sulfides, phosphorous and alkalis may also be present but are normally considered to have no significant effect on the properties of the calcium aluminate cement. Typical of the calcium aluminate cements which are present in the market place are those known as "ciment fondu" or "Lumnite". The calcium aluminate cement, which is not a Portland cement, is of particular advantage in the present invention, because unlike Portland cements it has extremely high early strength, is highly refractory, and is highly resistant to the attack of the molten metal. In the present composition the calcium aluminate cement will comprise 30 to 55 parts by weight, preferably 40 to 50 parts by weight.

A second component of the composition of this invention is crysotile asbestos fiber. The crysotile is a hydrated magnesium silicate fiber which comprises the large majority of commercial asbestos fiber. Fiber sizes are normally specified by the Quebec Standard Screen Test, which employs a numerical scale in which the larger numbers indicate shorter fibers. While any QSST grade of fiber is suitable in the composition of this invention, it is convenient to use the short fiber grades 5 thru 7. The crysotile asbestos fiber component will be present as 2 to 25 parts by weight of the composition, preferably 4 to 20 parts by weight.

Also in the composition is a cryolite component. This material may be any of the commercial natural or synthetic cryolites. Typical natural commercial cryolites are composed of approximately 90% or more of sodium hexafluoroaluminate with a few percent of alumina present and a minor amount of other impurities such as calcium fluoride and/or iron oxide. Synthetic cryolite will, of course, be expected to have a much lower level of impurities. The impurities commonly present, however, are not of significance to the present invention. The cryolite component will be present in the composition as approximately 0.5 to 5 parts by weight, preferably about 1 to 3 parts by weight.

Also present in the composition will be an inorganic filler component. The material used for filler may also have some degree of binding properties. Typical inorganic fillers include diatomaceous earth, silica, clays, colloidal alumina and the like. While a variety of materials have been designated in the art as "inorganic fillers", only those which are compatible with molten aluminum can be used in the composition of this invention. However, since the properties of the various inorganic fillers are quite well known, those skilled in the art will be well aware of which materials will be satisfactory for use in the presence of the molten aluminum. The inorganic filler component will be present as approximately 10 to 35 parts by weight of the composition. Fillers may be used individually or mixtures of different fillers may be used. For instance, in the manufacture of extruded troughs a filler consisting of approximately 16 parts by weight of diatomaceous earth has been found quite satisfactory, and in the manufacture of pressed boards 24 parts by weight of an inogranic filler comprising 10 parts by weight of bentonite clay and 14 parts by weight of diatomaceous earth has been found satisfactory.

Optionally, and in a preferred embodiment, the composition also comprises 10 to 30 parts by weight of refractory fiber, preferably 15–25 parts by weight. Refractory fibers suitable for use in the present invention are those synthetic inorganic fibers formed from melts of compositions generally predominantly of silicates of calcium, aluminum and the like di- or tri-valent metals. These will, in most cases, be the highly refractory fibers consisting wholly of alumina and silica or primarily of alumina and silica with added oxides such as titania, zirconia or chromia. Other inorganic fibrous materials may be present such as slag wools or rockwools, mineral wools, glass wools, borosilicate fibers, pure silica fibers, glass fibers and the like, although they should be kept as a minor part of the refractory fiber component. Preferably the refractory fiber component will be virtually all aluminosilicate fibers.

Additionally a small amount of water will be present in the composition. Initially this is only the amount necessary for extrusion, molding and the like to the desired shape. Ultimately, following curing and drying of the shaped body, a certain amount of that moisture will be lost and/or chemically combined. Consequently it is not possible to state a specific numerical quantity for the water present. However, those skilled in the art can readily ascertain how much water is necessary to add to any particular dry composition to form a tractable mixture.

The composition of this invention is readily shapeable into a desired configuration by common plastic molding techniques. Those which are contemplated as being the principal techniques of utility with this invention are extrusion, injection molding, and press molding.

Extrusion may be used to form the elongated troughs, and cylinders, bars, and the like, if desired, flat sheets which can be cut into individual boards. Alternatively, these shapes, but preferably boards, can be press molded in suitable shaped or flat molds. The press molds will have means for extraction of water which is pressed out of the tractable mixture at the time of such molding. Conventional press molding, injection molding and extrusion equipment may be used; for instance with extrusion one may use auger or ram extruders. When the shaped bodies, such as troughs, are formed by extrusion, it is preferred to incorporate into the mixture various conventional extrusion aids such as extruder lubricant and/or cement retarders. The extruder lubricants and similar materials aid the formation of continuous smooth extrude aids. The presence of cement retarders prevents the premature setting or gelling of the cementitious composition so that a sustained extruder run can be maintained.

As illustrative of the compositions and shaped bodies of this invention, extruded troughs were made on a commercial extrusion unit. The composition which was utilized contained, on a dry weight basis, 40% calcium aluminate cement (for instance "CA-25", a calcium aluminate cement manufactured by the Alcoa Company), 20% refractory fiber (a synthetic aluminosilicate fiber commercially available under the trade name "CERAFIBER" from the Johns-Manville Corporation), 20% 5R crysotile asbestos fiber, 16% diatomite (commercially available under the trade designation "CELITE 392" from the Johns-Manville Corporation), 2% cryolite and 2% of a commercial ethylene oxide polymer having average molecular weight on the order of three million (commercially available under the trade designation "Polyox WSR301") as an extrusion aid. An additional 3% (based on weight of calcium aluminate cement) of an anionic polyelectrolyte cement retarder (commercially available under the trade designation "Darvan No. 7" from the R. T. Vanderbilt Company) was also present. Typical troughs were made with outside dimensions of approximately 7" width and 10" height with wall thicknesses of approximately 1" inch at the top tapering to 1¼" at the bottom of the trough. Of course, with a change in die sizes, extrudates of many other dimensions and/or shapes can be readily made in the same manner. While virtually any length of trough may be extruded, it has been found most convenient for handling and installation purposes to segment the extrudate into 5' to 8' lengths.

In another example, flat boards were made by press molding a composition containing 50% by weight of calcium aluminate cement, 20% by weight of refractory fiber, 4% by weight of 5R crysotile asbestos fiber, 14% by weight of diatomaceous earth, 10% by weight of bentonite clay, and 2% by weight of cryolite (all materials being those described in the example above). Boards were made with the dimensions of 2' by 2' by 1" by press molding under a pressure of about 800 psi. The particular pressure to be used will be dependent on the desired density and final thickness of the board. The particular board sizes exemplified here were made for laboratory evaluation; commercial production sizes would normally be 4'×8'×¾" to 1¼".

The above mentioned boards and troughs were allowed to cure in a moist atmosphere at room temperature for 24 hours to complete hydration of the cement. Thereafter they were are oven dried at about 150° C. to 315° C. for at least about 10 hours and then heat treated for five hours at 650° C. This heat treating has been found necessary to provide materials which are satisfactorily resistant to molten aluminum and sufficiently refractory to contain the aluminum in a molten condition. The heat treating will generally be at temperatures of at least 480° C., and usually at temperatures of at least about 650° C., for periods of generally at least ½ hour, preferably for 3 to 10 hours.

The boards and troughs formed under the above cited conditions were found to give superior performance in transporting and containing molten aluminum.

What I claim is:

1. A composition which consists essentially of the mixture of, in parts by weight:

| | |
|---|---|
| calcium aluminate cement | 30-55 parts |
| chrysotile fiber | 2-25 parts |
| cryolite | 0.5-5 parts |
| refractory fiber | 10-30 parts |
| inorganic filler compatible with molten aluminum | 10-35 parts | and sufficient water to render the mixture tractable yet capable of being formed by extrusion into a shape retaining insulating body suitable for use in contact with molten metal.

2. The composition of claim 1 wherein said refractory fiber comprises synthetic inorganic fibers of silicates of di-valent or tri-valent metals.

3. The composition of claim 2 wherein said refractory fibers comprise synthetic aluminosilicate fibers.

4. The composition of claim 1 consisting essentially of, in parts by weight:

| | |
|---|---|
| calcium aliminate cement | 40-50 parts |
| chrysotile fiber | 4-20 parts |
| cryolite | 1-3 parts |
| refractory fiber | 15-25 parts |
| inorganic filler compatible with molten aluminum | 10-35 parts |
| water | balance |

5. The composition of claim 4 wherein said inorganic filler comprises diatomaceous earth.

6. The composition of claim 4 wherein said inorganic filler comprises the mixture of diatomaceous earth and clay.

7. A shaped insulating article compatible with and resistant to contact with molten aluminum, said article formed by extrusion from a mixture which consists essentially of, in parts by weight:

| | |
|---|---|
| calcium aluminate cement | 35-55 parts |
| chrysotile fiber | 2-25 parts |
| cryolite | 0.5-5 parts |
| refractory fiber | 10-30 parts |
| inorganic filler compatible with molten aluminum | 10-35 parts | and water in amount sufficient to render said mixture tractable yet shape retaining, said article having been cured, dried, and then treated for a period of at least ½ hour at a temperature of at least 480° C.

8. The shaped article of claim 7 comprising an elongated trough.

9. The shaped article of claim 7 comprising a flat board.

10. A process for the formation of shaped insulating articles compatible with and resistant to contact with molten aluminum, which comprises:
(a) forming a mixture consisting essentially of, in parts by weight:

| | |
|---|---|
| calcium aluminate cement | 35-55 parts |
| chrysotile fiber | 2-25 parts |
| cryolite | 0.5-5 parts |
| refractory fiber | 10-30 parts |
| inorganic filler compatible with molten aluminum | 10-35 parts | and sufficient water to render said mixture tractable yet shape retaining;
(b) extruding said mixture through a die into the desired shape;
(c) curing the extruded body; and
(d) drying said extruded body; and
(e) heat treating the extruded body at a temperature of at least 480° C. for a period of at least ½ hour.

11. The process of claim 10 wherein said heat treating is at a temperature of at least 650° C.

12. The composition of claim 4 wherein said refractory fiber comprises synthetic inorganic fibers of silicates of di-valent or tri-valent metals.

13. The composition of claim 12 wherein said refractory fiber comprises synthetic aluminosilicate fibers.

* * * * *